United States Patent
Hsieh et al.

(10) Patent No.: US 8,953,161 B2
(45) Date of Patent: Feb. 10, 2015

(54) OPTICAL SPECTRUM ANALYZER WITH CONTINUOUSLY ROTATING TUNABLE FILTER

(71) Applicants: Yung-Chieh Hsieh, San Jose, CA (US); Chiayu Ai, Newark, CA (US)

(72) Inventors: Yung-Chieh Hsieh, San Jose, CA (US); Chiayu Ai, Newark, CA (US)

(73) Assignee: Optoplex Corporation, Fremont, CA (US)

( * ) Notice: Subject to any disclaimer, the term of this patent is extended or adjusted under 35 U.S.C. 154(b) by 0 days.

(21) Appl. No.: 13/668,463

(22) Filed: Nov. 5, 2012

(65) Prior Publication Data

US 2014/0125975 A1     May 8, 2014

Related U.S. Application Data

(60) Continuation of application No. 13/103,291, filed on May 9, 2011, now abandoned, which is a division of application No. 11/810,873, filed on Jun. 7, 2007, now Pat. No. 7,961,316.

(60) Provisional application No. 60/811,719, filed on Jun. 7, 2006.

(51) Int. Cl.
*G01J 3/28*     (2006.01)

(52) U.S. Cl.
USPC .......................................................... 356/328

(58) Field of Classification Search
USPC ............................................. 356/30, 326, 328
See application file for complete search history.

(56) References Cited

U.S. PATENT DOCUMENTS

| 5,231,461 | A   | * | 7/1993 | Silvergate et al. | 356/326 |
| 6,512,582 | B1  | * | 1/2003 | Mori et al. | 356/308 |
| 6,665,069 | B1  |   | 12/2003 | Permogorov et al. | |
| 7,002,680 | B2  |   | 2/2006 | Kaneko | |
| 7,233,394 | B2  | * | 6/2007 | Odhner | 356/328 |
| 2007/0285659 | A1 | * | 12/2007 | Hsieh et al. | 356/308 |
| 2011/0211194 | A1 | * | 9/2011 | Hsieh et al. | 356/328 |

* cited by examiner

*Primary Examiner* — Abdullahi Nur
(74) *Attorney, Agent, or Firm* — Antonio R. Durando

(57) ABSTRACT

An optical spectrum analyzer is implemented with a detector combined with a tunable filter mounted on a stage capable of 360-degree rotation at a constant velocity. Because of the constant rate of angular change, different portions of the input spectrum are detected at each increment of time as a function of filter position, which can be easily measured with an encoder for synchronization purposes. The unidirectional motion of the mirror permits operation at very high speeds with great mechanical reliability. The same improvements may be obtained using a diffraction grating or a prism, in which case the detector or an intervening mirror may be rotated instead of the grating or prism.

16 Claims, 4 Drawing Sheets

OPTICAL SPECTRUM ANALYZER WITH CONTINUOUSLY ROTATING TUNABLE FILTER

RELATED APPLICATIONS

This application is a continuation-in-part application of U.S. Ser. No. 13/103,291, filed May 9, 2011, which is a divisional application of U.S. Ser. No. 11/810,873, filed Jun. 7, 2007, issued as U.S. Pat. No. 7,961,316, which was based on U.S. Provisional Ser. No. 60/811,719, filed Jun. 7, 2006.

BACKGROUND OF THE INVENTION

1. Field of the Invention

This invention pertains to the general field of optical spectrum analyzers, especially as used in communication networks. In particular, the invention relates to an optical spectrum analyzer with a continuously rotating scanning mechanism.

2. Description of the Prior Art

Optical spectrum analyzers (often referred to in the art as OSAs) are usually implemented in the art using Michelson interferometers, tunable Fabry-Perot optical filters, and diffraction gratings. As illustrated schematically in FIG. 1, in conventional diffraction grating applications the input beam I is combined with a diffraction grating 10 to separate different wavelengths and direct them in respective separate directions. A mirror 12 is used to reflect a portion of the diffracted spectrum toward a light detector 14 through collection optics 16, 18 suitable for the particular application. (A beam splitter 16 is illustrated, but it is understood that more efficient optics would generally be used in practice.)

When the angular position $\alpha$ of the mirror 12 with respect to the grating 10 is changed (or vice versa), as illustrated by arrow A, the wavelength reflected by the mirror varies. Therefore, the entire spectrum produced by the grating 10 may be collected by the detector 14 by varying the angle of incidence through a scan sufficiently wide to cover the spectrum. Typically, this scanning operation is carried out by mounting the mirror on a plate 20 that is alternately rotated by a suitable mechanism 22 in opposite directions over a predetermined angular range $-\theta_{max}$ to $+\theta_{max}$. Alternatively, the grating is oscillated in similar manner instead of the mirror.

This conventional approach suffers from several undesirable drawbacks. Because the plate supporting the mirror 12 necessarily changes direction between scan oscillations, the requirements for its mechanical implementation are rigorous, expensive, and often unreliable. The alternating motion of the mirror also limits the speed at which it can be oscillated, typically to a maximum speed of 100 milliseconds per cycle. Furthermore, a wavelength reference device 24 has to be built into the optical spectrum analyzer in order to synchronize the timing of wavelength reflection by the mirror with the detector reading. That is, each acquisition frame of the detector must be related to a wavelength, which in turn corresponds to an angular position of the mirror 12 in relation to the grating 10. The need for this additional hardware is undesirable because of its expense and potential operating complications.

Similar problems belie optical spectrum analyzers implemented with Michelson interferometers and tunable Fabry-Perot optical filters because they also require rapid oscillating motion. Therefore, the approach of the prior art to optical spectrum analyzer implementation is not particularly efficient for telecommunication applications and any less expensive and more precise technology would be very desirable in the art. This disclosure provides a simple solution to achieve such a desirable advance.

SUMMARY OF THE INVENTION

This invention provides a novel approach to optical spectrum analyzers based on the idea of varying the angle between the device producing the spectrum and the detector or reflecting mirror through continuous rotation, rather than through oscillating motion. This approach enables the optical spectrum analyzer to function without oscillation of any component and with greater speeds of data acquisition.

According to an embodiment of the invention implemented with a diffraction grating, a mirror is mounted on a stage capable of 360-degree rotation at a constant velocity. Because of the constant rate of angular change, different portions of the diffracted spectrum are reflected and detected at each increment of time as a function of mirror position, which can be easily measured with an encoder for synchronization purposes. Furthermore, the unidirectional motion of the mirror permits operation at very high speeds with great mechanical reliability.

The same result may be obtained by rotating the diffraction grating instead of the mirror. In that case, the diffracted spectrum may be detected directly by the detector without the use of a mirror.

According to another embodiment, the invention combines a tunable filter with a stationary mirror or detector. The tunable filter is used in conventional manner to pass different wavelengths of the input beam sequentially by varying its angle of incidence, thereby producing a single wavelength at a time. At each time of acquisition, a different wavelength is either detected directly or reflected to the detector by a stationary mirror.

Various other advantages will become clear from the description of the invention in the specification that follows and from the novel features particularly pointed out in the appended claims. Therefore, to the accomplishment of the objectives described above, this invention consists of the features hereinafter illustrated in the drawings, fully described in the detailed description of the preferred embodiments, and particularly pointed out in the claims. However, such drawings and descriptions disclose only some of the various ways in which the invention may be practiced.

DETAILED DESCRIPTION OF THE INVENTION

The invention is directed at providing an improved optical spectrum analyzer with a novel approach to the way the various wavelengths in the spectrum of the input beam are separated and detected. For the purposes of the present invention, the term "wavelength" is used to indicate a single wavelength as intended in the art within the parameters of currently available technology to isolate and measure a single wavelength. The terms "constant rotation" and "constantly rotating" are used to refer to a rotating motion having constant angular velocity (such as produced by a synchronous electric motor) as opposed to oscillating, rotational back-and-forth motion. The term "tunable filter" is intended to refer to any filter wherein the wavelength of the output beam in a given direction of propagation may be varied by rotating the filter with respect to the input beam, thereby changing its angle of incidence.

Figure 1:
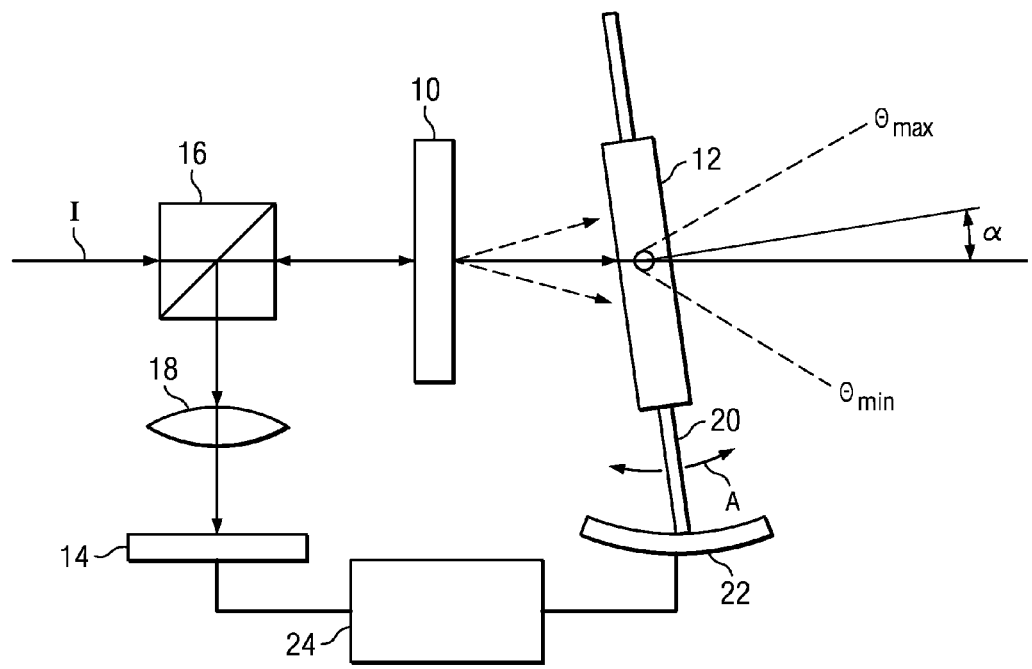
FIG. 1 illustrates a typical prior-art configuration for a diffraction grating optical spectrum analyzer.
Figure 2A:
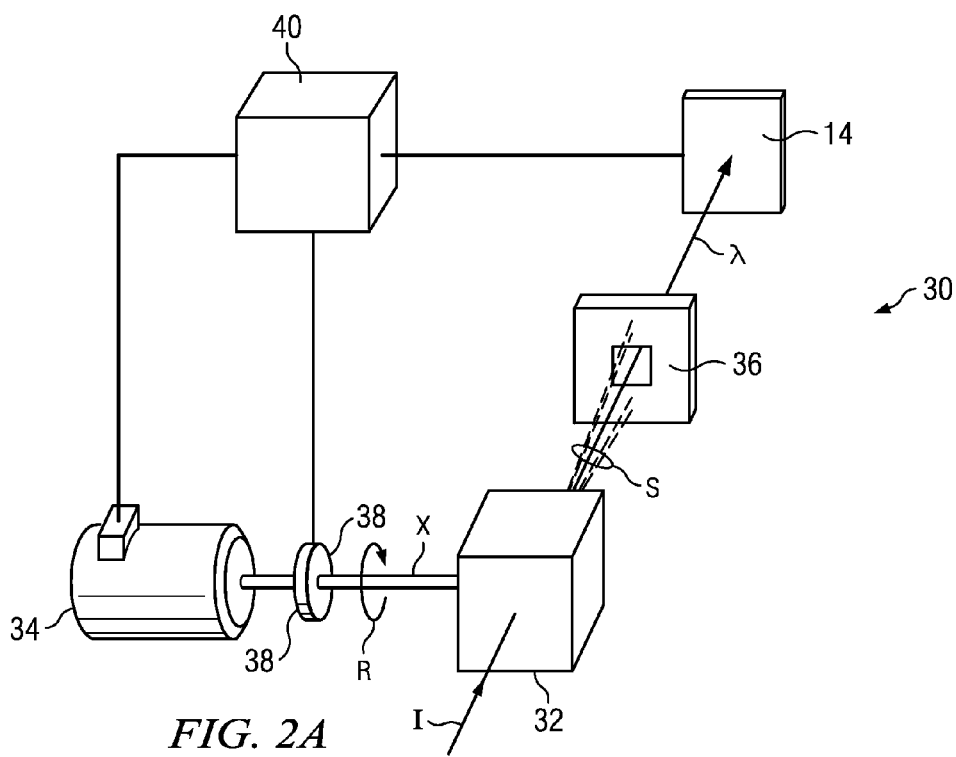
FIG. 2A is a schematic illustration of an optical spectrum analyzer according to the invention wherein an input beam is directed to a continuously rotating optical device that spatially separates the spectrum of the incident beam and directs a single isolated wavelength toward a stationary detector.

The invention lies in the idea of using a constantly rotating device to produce the varying wavelength detected at any given time by the detector of the spectrum analyzer. Referring to the figures, wherein like parts are designated with like numerals and symbols, FIG. 2A illustrates schematically an optical spectrum analyzer 30 according to the invention. The OSA includes a conventional optical device 32 capable of spatially separating wavelengths in the spectrum of an incident input beam I, either by diffraction or refraction of the light. As such, the optical device 32 may be a diffraction grating or a prism. The device 32 is coupled to a motor 34 so that it can be rotated continuously at a constant angular speed (denoted by the arrow R) around an axis of rotation X adapted to produce a spectral output S directed toward a detector 14. A field stop 36 is preferably used in front of the detector 14 in order to block most of the spectral output S, allowing substantially only a single-wavelength beam λ to reach the detector 14.

Note that the same result could be achieved by rotating the detector 14, rather than the optical device 32. In that case, the aperture 36 would be connected to the detector 14 so that it could rotate with it, and the motor 34 would be coupled to the detector to provide continuous rotation around an axis substantially perpendicular to the direction of the wavelength λ incident upon the detector.

Figure 2B:
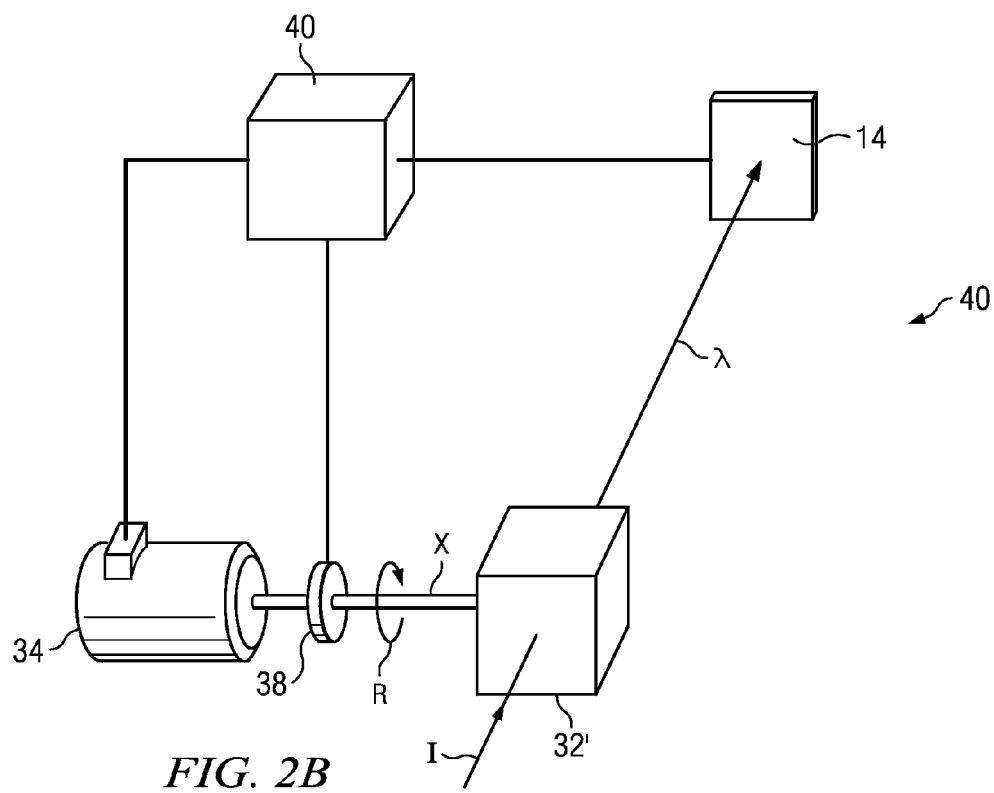
FIG. 2B is an illustration of an optical spectrum analyzer according to the invention wherein an input beam is directed to a continuously rotating optical tunable filter, thereby sequentially transmitting different wavelengths of the spectrum of the incident beam toward a stationary detector.

FIG. 2B illustrates another embodiment 40 of the invention wherein the optical device consists of a tunable filter 32' adapted to sequentially transmit a different wavelength λ of the input beam spectrum toward the detector 14. The tunable filter 32' is coupled to the motor 34 so that it can be rotated continuously at a constant angular speed, as in the case of the embodiment of FIG. 2A. Inasmuch as a tunable filter produces a substantially single wavelength at a time directed to the detector, the field stop 36 is not necessary when the invention is implemented with a tunable filter.

As one skilled in the art would readily understand, the continuous rotation of the optical device 32,32' causes a different wavelength λ of the input beam's spectrum (or no light at all, depending on the angular position of the device) to reach the detector 14 at any given time, in the same manner as OSAs functioning with back-and-forth oscillating motion. However, because the speed of rotation of the motor 34 can be controlled to remain very constant, the exact position of the optical device 32,32' with respect to the input beam I can be tracked easily and precisely with an encoder 38 and ascertained at every frame of data acquisition of the detector 14. As a result, the wavelength corresponding to each frame of data acquisition is known for conventional storage and processing with a computer 40. With the aid of an encoder, the angular motion of the motor does not need to be controlled accurately. Thus, a brushless DC motor, a well known device with long service life, can be used with a simple control to practice the invention.

Figure 3:
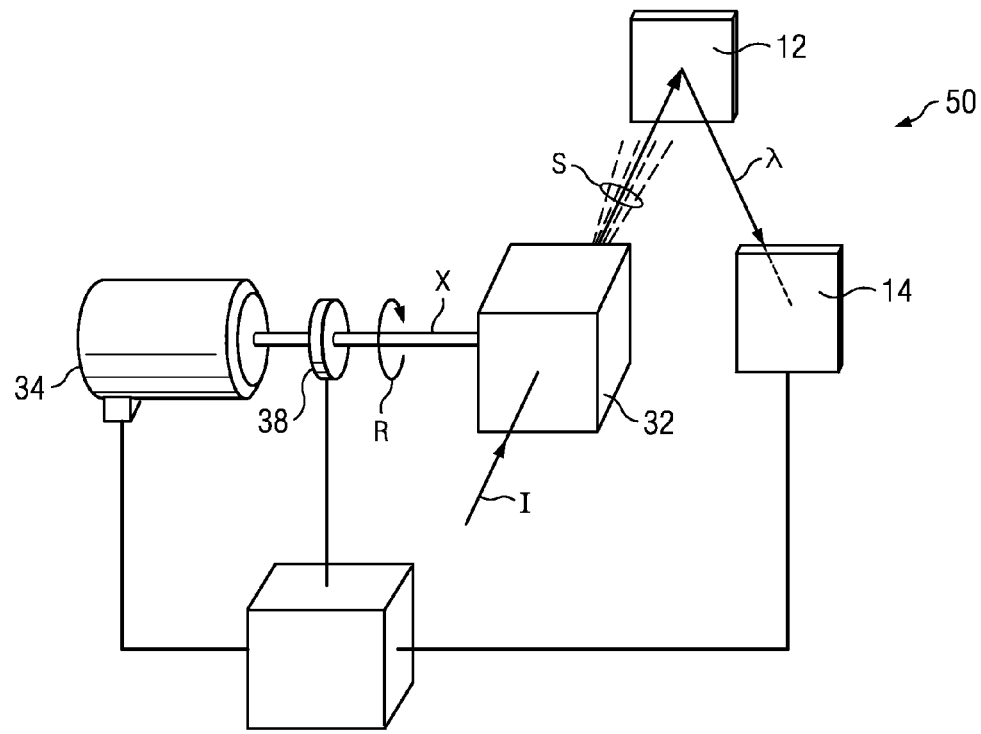
FIG. 3 is a schematic representation of the optical spectrum analyzer of FIG. 2-A wherein the isolated wavelength is reflected toward the detector by an intervening mirror.

In another embodiment 50 of the invention illustrated in FIG. 3, the spectral output beam S is directed toward a mirror 12 from which a single-wavelength beam λ is reflected toward the detector 14. Because of the stationary position of the mirror 12 with respect to the detector 14, a single wavelength is reflected toward the detector at any given time for detection and processing. An encoder 38 and a computer 40 are similarly connected to the optical device 32,32' to synchronize detected wavelength and detection time.

Figure 4:
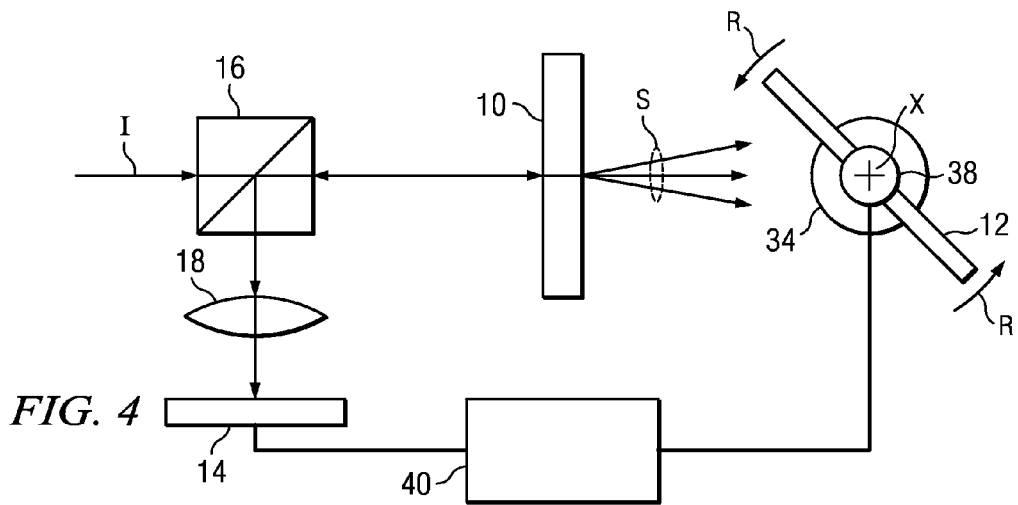
FIG. 4 illustrates schematically another embodiment of the invention wherein a stationary diffraction grating is combined with a continuously rotating mirror reflecting different isolated wavelengths toward a detector as a function of time.

If the optical device 32 of FIG. 2A used to separate the spectral wavelengths of the input beam I is a diffraction grating or a prism, the invention can be implemented in similar manner by rotating the detector or the mirror, rather than the grating or the prism. For example, as illustrated schematically in FIG. 4, a stationary diffraction grating 10 may be combined with a mirror 12 coupled to a motor 34 rotating continuously around the axis X (as noted by the arrows R), thereby reflecting toward a detector 14 (through some appropriate optics 16,18) different wavelengths of the spectrum produced by the diffraction grating 10.

Figure 5:
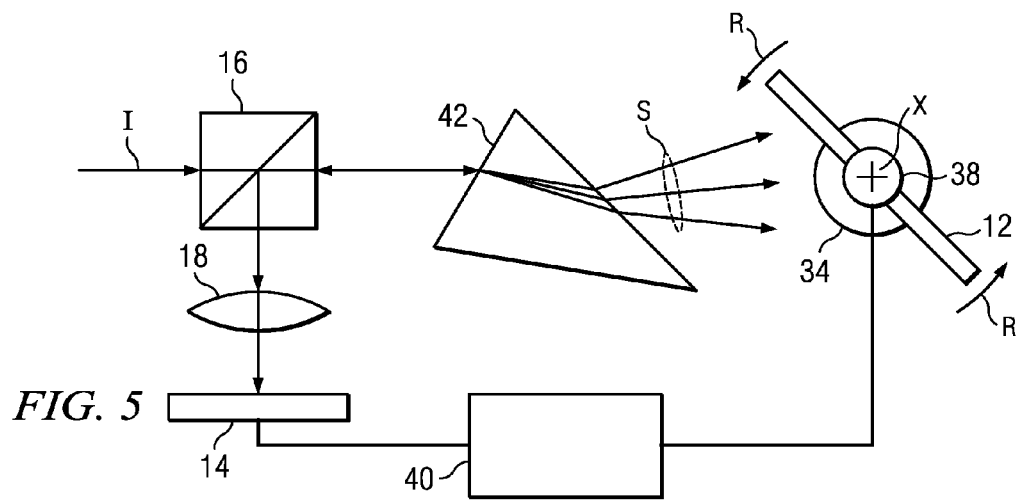
FIG. 5 illustrates an embodiment of the invention wherein a stationary prism is combined with a continuously rotating mirror.

FIG. 5 illustrates a similar arrangement where a prism 42 is used to refract the input beam I and produce the output spectrum S. The constant rotation of the mirror 12 scans through the spectrum S and sequentially reflects a different wavelength toward the detector 14. The cycle is repeated at each rotation of the mirror, thereby providing the necessary scan to capture each wavelength of the input beam as a function of time.

Figure 6:
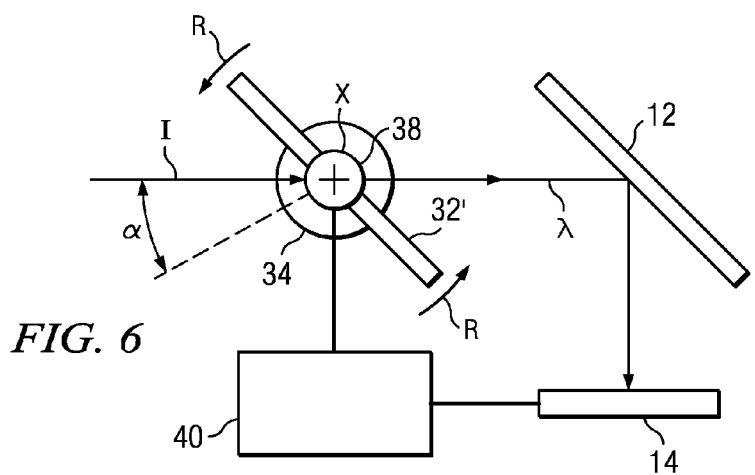
FIG. 6 illustrates an embodiment of the invention wherein a continuously rotating tunable filter is combined with a stationary mirror.

According to another embodiment of the invention, shown in FIG. 6, a tunable filter 32' is combined with a stationary mirror 12 to direct the output beam λ toward the detector 14. Any conventional tunable filter is suitable to practice the invention, so long as capable of producing a bandwidth λ commensurate with the resolution desired for the optical scanner analyzer. Inasmuch as a tunable filter is in essence a spectrometer, its wavelength accuracy is very high. As illustrated in FIG. 6, the relation between the angle of incidence α of an input light I and the wavelength λ of the light reflected by the mirror 12 is precisely defined.

Figure 7A:
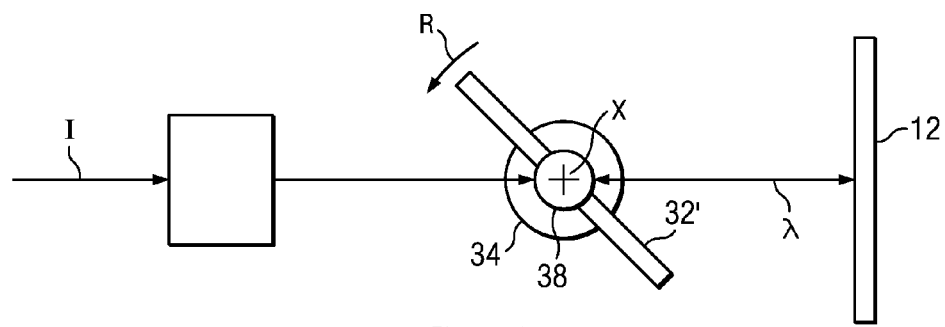
FIGS. 7A and 7B show schematic side elevational and top views of the preferred embodiment of the invention, wherein a continuously rotating tunable filter is combined with a stationary mirror that reflects the output beam back through the tunable filter in order to improve the quality of the beam.
Figure 7B:
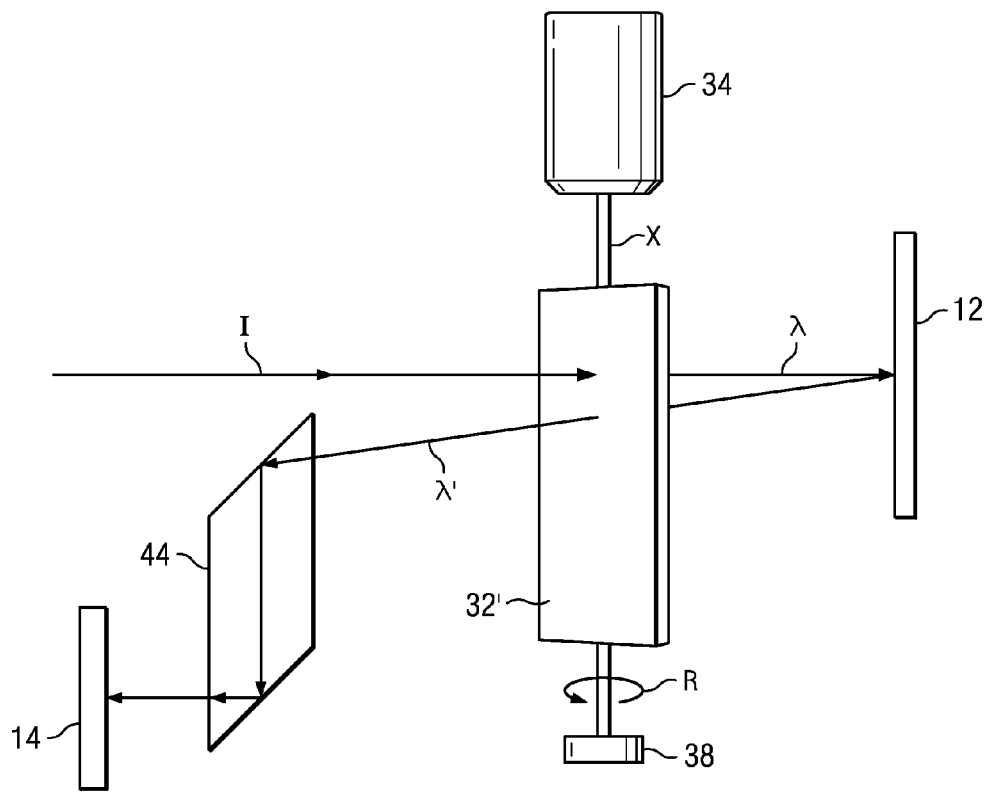

The preferred embodiment of the invention is illustrated schematically in the side and top views of FIGS. 7A and 7B, respectively. A tunable filter 32' is combined with a stationary mirror 12, as in FIG. 6, but the output beam λ is reflected back through the tunable filter, thereby achieving the advantage of additional filtering in producing the output beam λ'. A rhomb prism 44 is used to separate the output from the input beam I and direct it, through appropriate optics (not shown) toward the detector 14. Any similar optics, such as a coupler or an optical circulator, could be used in similar fashion.

The speed of the motor 34 (or other device used to rotate the tunable filter 32') needs to be controlled by a precise clock that permits the sequential synchronization of the position of the filter 32', measured by the encoder 38, with the wavelengths received by the detector 14 at any given time. Because of the continuous rotation introduced by the invention, this synchronization may be achieved advantageously without the use of expensive wavelength reference devices, or even without the use of an encoder, because of the linear relationship between the angular position of the filter and time. If an encoder 38 is utilized, the angular position may be measured with a definition better than 0.01 degrees. Moreover, the mechanical reliability of the OSA is markedly improved by the absence of the acceleration and deceleration forces inherent with oscillating mechanisms. Because the motor 34 can be rotated at very high speeds without loss of synchronization, the time of data acquisition may also be improved significantly. For example, 6,000 revolutions per minute correspond to about 10 microseconds per acquisition cycle (i.e., per scan), which is much faster that most oscillating mechanical systems.

Thus, a simple and cost-effective method has been disclosed to implement an optical spectrum analyzer that combines a detector with an optical device that separates the various wavelengths of an input beam. The preferred embodiment consists of a tunable filter coupled to a motor to produce a cyclical scan of the input beam's spectrum onto a stationary detector. A stationary mirror and/or appropriate optics may be used in the OSA in conventional manner to optimize the performance of the device.

While the invention has been described in what is believed to be the most practical and preferred embodiments, it is recognized that appropriate deviations can be made within the scope of the disclosure. For example, the mechanism used to provide continuous rotation has been described as a synchronous motor or a brushless motor, but it is understood that any other device capable of effecting such motion would be suitable to practice the invention. Therefore, the invention is not to be limited to the disclosed details, but is intended to embrace all equivalent structures and methods.

The invention claimed is:

1. An optical spectrum analyzer comprising:
    an optical device for producing a wavelength separation in a spectrum of an incident input beam;
    a detector;
    a mirror optically coupled to said optical device such that the mirror at any given time reflects toward the detector a single separated wavelength of said spectrum of the incident input beam; and
    a mechanism for continuous 360-degree rotation of said mirror at a constant velocity, thereby varying said single separated wavelength received by the detector as a function of time.

2. The optical spectrum analyzer of claim 1, wherein said optical device is a diffraction grating.

3. The optical spectrum analyzer of claim 1, wherein said optical device is a prism.

4. The optical spectrum analyzer of claim 1, wherein said mechanism for continuously rotating said mirror is a synchronous motor.

5. The optical spectrum analyzer of claim 1, further including an encoder for synchronizing an angular position of said mirror with said single separated wavelength.

6. A method of analyzing an optical spectrum comprising the following steps:
    separating with an optical device a plurality of wavelengths in a spectrum of an incident input beam;
    optically coupling a mirror to said optical device such that the mirror at any given time receives a single wavelength of said spectrum of the incident input beam and reflects it toward a detector; and
    continuously rotating said mirror 360 degrees at a constant velocity, thereby varying said single wavelength received by the detector as a function of time.

7. The method of claim 6, wherein said optical device is a tunable filter.

8. The method of claim 6, wherein said rotating step is carried out with a synchronous motor.

9. The method of claim 6, further including the step of reflecting said single wavelength toward said detector.

10. The method of claim 6, further including the step of synchronizing with an encoder an angular position of said optical device with said single wavelength.

11. The method of claim 6, further including the step of isolating said single wavelength with a field stop.

12. The method of claim 6, further including the steps of reflecting said single wavelength toward the detector, and synchronizing an angular position of the optical device with the single wavelength; wherein the optical device is a tunable filter, and said rotating step is carried out with a brushless motor.

13. The method of claim 6, wherein said optical device is a diffraction grating.

14. The method of claim 13, further including the steps of reflecting said single wavelength toward the detector, and synchronizing an angular position of the diffraction grating with the single wavelength; and wherein said rotating step is carried out with a brushless motor.

15. The method of claim 6, wherein said optical device is a prism.

16. The method of claim 15, further including the steps of reflecting said single wavelength toward the detector, and synchronizing an angular position of the prism with the single wavelength; wherein said rotating step is carried out with a brushless motor.

* * * * *